(12) United States Patent
Okonski, Jr.

(10) Patent No.: US 8,814,176 B2
(45) Date of Patent: Aug. 26, 2014

(54) DEVICE FOR SEALING INTERSECTING JOINTS

(76) Inventor: John E. Okonski, Jr., Niskayuna, NY (US)

( * ) Notice: Subject to any disclaimer, the term of this patent is extended or adjusted under 35 U.S.C. 154(b) by 0 days.

(21) Appl. No.: 13/560,024

(22) Filed: Jul. 27, 2012

(65) Prior Publication Data

US 2013/0038029 A1    Feb. 14, 2013

Related U.S. Application Data

(60) Provisional application No. 61/521,502, filed on Aug. 9, 2011.

(51) Int. Cl.
*F16J 15/00* (2006.01)
*F16J 15/06* (2006.01)

(52) U.S. Cl.
CPC .................................. *F16J 15/062* (2013.01)
USPC .......................................... 277/650; 277/637

(58) Field of Classification Search
USPC ......... 277/628, 637, 642, 644, 648, 649, 650, 277/641
See application file for complete search history.

(56) References Cited

U.S. PATENT DOCUMENTS

| | | | | |
|---|---|---|---|---|
| 3,871,666 A | * | 3/1975 | Franz et al. | 277/563 |
| 3,942,805 A | * | 3/1976 | Sundqvist | 277/431 |
| 5,147,494 A | * | 9/1992 | Torii et al. | 156/417 |
| 6,641,141 B2 | * | 11/2003 | Schroeder | 277/552 |
| 6,648,336 B1 | * | 11/2003 | Kostrzewsky et al. | 277/549 |
| 2009/0072497 A1 | * | 3/2009 | Kunitake et al. | 277/641 |
| 2009/0146379 A1 | * | 6/2009 | Foster et al. | 277/307 |
| 2010/0201080 A1 | * | 8/2010 | Kunitake et al. | 277/641 |
| 2010/0237565 A1 | * | 9/2010 | Foster | 277/377 |
| 2011/0042903 A1 | * | 2/2011 | Schrufer et al. | 277/385 |

* cited by examiner

*Primary Examiner* — Gilbert Lee
(74) *Attorney, Agent, or Firm* — Stephen F. Swinton, Jr.; Hoffman Warnick LLC

(57) ABSTRACT

Embodiments of the invention relate generally to sealing devices and, more particularly, to devices for sealing intersecting joints. In one embodiment, the invention provides a device for sealing intersecting joints, the device comprising: a compliant central body; a first compliant leg extending outward from the compliant central body; a second compliant leg extending outward from the compliant central body at a first angle relative to the first compliant leg, wherein each of the first compliant leg and the second compliant leg comprises a blind bore into which a length of o-ring, c-seal, or other geometric-type seal material may be inserted.

20 Claims, 4 Drawing Sheets

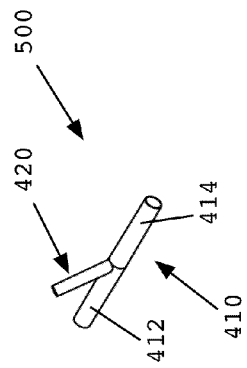
FIG. 4
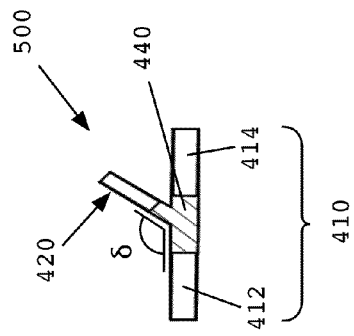
FIG. 5A
FIG. 5B

DEVICE FOR SEALING INTERSECTING JOINTS

CROSS-REFERENCE TO RELATED APPLICATIONS

This application claims the benefit of U.S. Provisional Patent Application No. 61/521,502, filed 9 Aug. 2011, which is hereby incorporated herein.

BACKGROUND OF THE INVENTION

Numerous devices are known for which one or more seals are required to seal joints in the device. Pumping devices, vacuum devices, engines, jointed delivery channels (e.g., hoses, tubing, etc.), reservoir chambers for liquid and/or gaseous materials, storage vessels, etc. all require some type of seal in order to function properly. As the positive or negative pressure at which such devices operate is increased, the need for proper sealing similarly increases if the device is to function properly, if at all.

The designs of many such devices, if otherwise unconstrained, would include two or more intersecting joints that must be sealed. Often, however, the feasibility of forming proper seals of intersecting joints proves more difficult than redesigning the device itself to avoid such intersecting joints, even where such redesign results in a relatively less desirable, less efficient, and/or more costly design.

BRIEF DESCRIPTION OF THE INVENTION

In one embodiment, the invention provides a device for sealing intersecting joints, the device comprising: a compliant central body; a first compliant leg extending outward from the compliant central body; a second compliant leg extending outward from the compliant central body at a first angle relative to the first compliant leg, wherein each of the first compliant leg and the second compliant leg comprises a blind bore into which a length of o-ring, c-seal, or other formed seal shape material may be inserted.

In another embodiment, the invention provides a device for sealing intersecting joints, the device comprising: a first compliant portion; a second compliant portion intersecting with the first compliant portion at an angle, wherein each of the first compliant portion and the second compliant portion comprises a through bore into at least one of which an o-ring, c-seal, or other formed seal shape may be inserted.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 4 shows a perspective view of a crossed seal body according to yet another embodiment of the invention.

FIGS. 5A and 5B show, respectively, perspective and side cross-sectional views of a crossed seal body according to still another embodiment of the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1A:
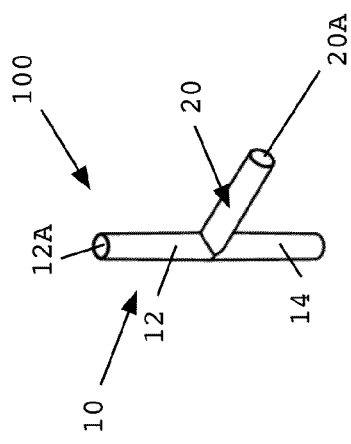
FIG. 1A shows a perspective view of a crossed seal body according to one embodiment of the invention.

Turning now to the drawings, FIG. 1A shows a perspective view of a crossed seal body 100. In some embodiments of the invention, the crossed seal body comprises a compliant elastomeric or deformable (permanently or non-permanently) material, such as a molded rubber, a molded elastomer, or a molded plastic. As used herein, the term "compliant" shall mean capable of adopting an altered size, shape, and/or orientation in response to an exerted force, including an exerted positive or negative pressure. Any of a number of materials may be employed in forming a crossed seal body according to embodiments of the invention.

For example, plastics, both thermoset (e.g., silicone) and thermoform (e.g., polypropylene, PVC) plastics are suitable for use in some embodiments of the invention. In other embodiments of the invention, metals can be formed, stamped, rolled, machined, or molded to form a crossed seal body. Metals are useful, for example, where the crossed seal body, in use will be exposed to high temperatures (i.e., temperatures above which plastics, rubbers, or other elastomers may be used). In still other embodiments of the invention, ceramic materials may be useful in forming the crossed seal body.

In other embodiments of the invention, composite materials may be employed. For example, fiberglass materials, including glass-filled nylons may be employed. Other composite materials, such as rubber- or silicon-coated metals may be useful. The material chosen in any particular case will depend, in part, for example, on the material of the device to be sealed and the material of the o-ring to be used in conjunction with the crossed seal body.

Crossed seal body 100 is shown having a first portion 10 and a second portion 20. As shown in FIG. 1A, first portion 10 and second portion 20 are substantially perpendicular, although this is not necessary. Indeed, one advantage of the crossed seal body 100 according to various embodiments of the invention is the freedom to accommodate seals intersecting each other at any angle. In the embodiment shown in FIG. 1A, crossed seal body 100 may be employed in sealing joints that meet substantially perpendicular to each other, with a first joint terminating at a second joint.

In the embodiment in FIG. 1A, first portion 10 is shown having a first leg 12 and a second leg 14. Second portion 20, on the other hand, comprises a single leg. Another advantage of crossed seal bodies according to embodiments of the invention is that any number of legs may be included, depending upon the particulars of the intersecting seals.

Figure 1B:
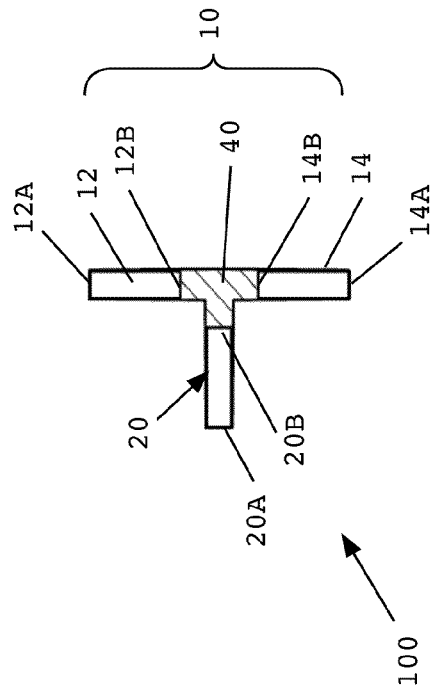
FIG. 1B shows a side cross-sectional view of the crossed seal body of FIG. 1A.

In the embodiment in FIG. 1A, each leg includes a bore opening 12A, 20A at its distal end. FIG. 1B shows a cross-sectional side view of crossed seal body 100. As can be seen in FIG. 1B, each leg 12, 14, 20 further includes a termination 12B, 14B, 20B, respectively, at its proximal end, where a central body 40 of the material of crossed seal body 100 lies. As such, each leg 12, 14, 20 comprises a blind bore into which a free end of an o-ring may be inserted. One skilled in the art will recognize, of course, that such embodiments of the invention require that an o-ring of suitable size for insertion into the blind bore be cut. Alternatively, a length of material otherwise suitable for use in an o-ring may be used in conjunction with a crossed seal body according to an embodiment of the invention.

It should be noted, of course, that while many applications in which embodiments of the invention may be employed will utilize o-rings having circular or substantially circular cross-sectional shapes, and that crossed seal bodies according to embodiments of the invention will similarly have circular or substantially circular cross-sectional shapes, this is not essential. For example, in some applications, it may be desirable or necessary to seal a device using an o-ring and crossed seal body having non-circular cross-sections. Such cross-sections may be square, rectangular, trapezoidal, triangular, dove tailed, or irregular in shape.

Figure 2:
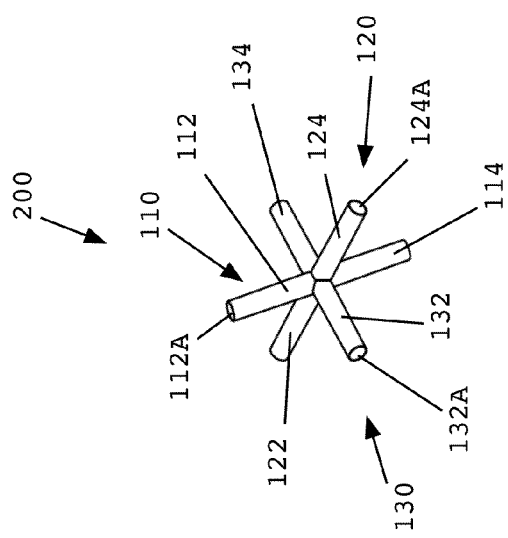
FIG. 2 shows a perspective view of a crossed seal body according to another embodiment of the invention.

FIG. 2 shows a perspective view of a crossed seal body 200 according to another embodiment of the invention in which crossed seal body 200 includes a first portion 110, a second portion 120, and a third portion 130, each of which is oriented substantially perpendicular to the other two. First portion 110 includes a first leg 112 and a second leg 114, second portion 120 includes a first leg 122 and a second leg 124, and third portion 130 includes a first portion 132 and a second portion 134.

Figure 3:
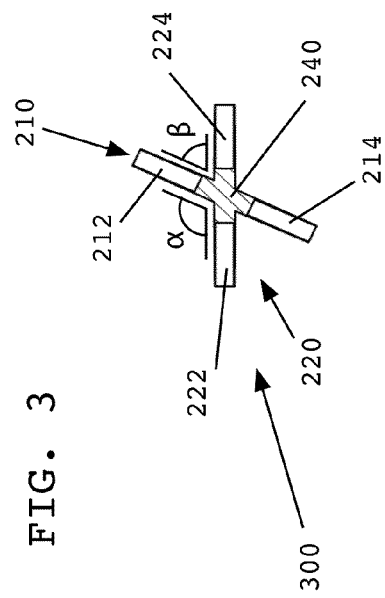
FIG. 3 shows a cross-sectional view of a crossed seal body according to still another embodiment of the invention.

FIG. 3 shows a cross-sectional view of a crossed seal body 300 according to another embodiment of the invention. Here, a first portion 210 and a second portion 220 cross non-perpendicularly within the same plane, forming an obtuse angle α and an acute angle β. A central body 240 lies at the intersection of first portion 210 and second portion 220.

FIG. 4 shows a perspective view of a crossed seal body 400 according to yet another embodiment of the invention, in which a second portion 320 and a third portion 330 are each substantially perpendicular to a first portion 310 but form an obtuse angle γ with respect to one another.

In the embodiments of the invention shown in FIGS. 1-4, the various portions of a crossed seal body are shown having substantially the same diameters, such that similarly sized o-rings or o-ring materials may be used in each. This is not necessary or essential, however. Numerous situations may arise that require the sealing of intersecting joints of differing dimensions. FIG. 5A shows a perspective view of a crossed seal body 500 according to another embodiment of the invention in which a first portion 410 has a diameter greater than a second portion 420. FIG. 5B shows a cross-sectional side view of crossed seal body 500 in which the differing diameters of first portion 410 and second portion 420 may be observed. In FIGS. 5A and 5B, second portion 420 is shown forming an obtuse angle δ with respect to first portion 410, although this is neither necessary nor essential.

Figure 6A:
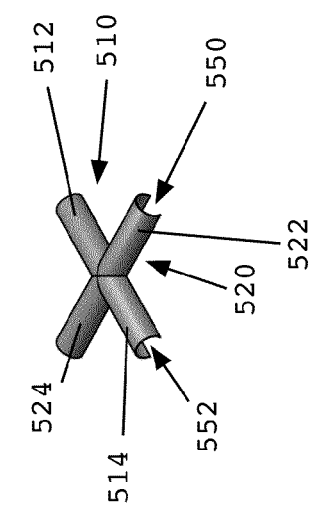
FIGS. 6A and 6B show, respectively, perspective and side cross-sectional views of a crossed seal body according to another embodiment of the invention.
Figure 6B:
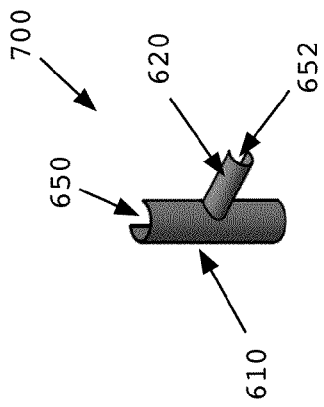

FIG. 6A shows a perspective view of a crossed seal body 600 according to still another embodiment of the invention. Here, first portion 510 and second portion 520 do not comprise blind bores, as in the embodiments described above. Rather, first portion 510 and second portion 520 include through bores 550, 552, respectively, into which at least one intact (i.e., uncut) o-ring may be inserted. FIG. 6B shows a cross-sectional side view of first portion 510 in which through bore 550 may be more easily seen.

Figure 7:
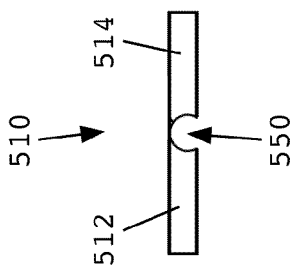
FIG. 7 shows a perspective view of a crossed seal body according to still another embodiment of the invention.

FIG. 7 shows a perspective view of a crossed seal body 700 according to another embodiment of the invention. As in FIG. 6A, first portion 610 and second portion 620 include through bores 650, 652, respectively.

Crossed seal bodies according to embodiments of the invention, in conjunction with corresponding o-rings or o-ring materials, permit the sealing of intersecting joints, as described above. In some circumstances, it may be desirable to secure the o-ring or o-ring material within the crossed seal body using a suitable adhesive. In other circumstances, this may be unnecessary, as pressurization of the device or vessel not only seals the intersecting joints, but also secures the o-ring or o-ring material into the crossed seal body. This pressure-induced securing of the o-ring or o-ring material and the crossed seal body is enhanced by the compliant, elastomeric or malleable nature of the crossed seal body.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for sealing intersecting joints, the device comprising:
   a compliant central body; and
   a plurality of compliant legs extending outward from the compliant central body, the plurality of legs including:
      a first compliant leg;
      a second compliant leg coplanar with respect to the first compliant leg; and
      a third compliant leg coplanar with respect to the first compliant leg and discretely coplanar with respect to the second compliant leg,
   wherein each of the first compliant leg and the second compliant leg includes a blind bore comprising a bore opening at a distal end of the compliant leg and a bore extending from the bore opening along a length of the compliant leg toward the compliant central body, into which a length of o-ring, c-seal, or other geometric-type seal material is inserted.

2. The device of claim 1, wherein the plurality of compliant legs intersect, forming a complex intersection comprised of the plurality of outwardly-radiating compliant legs.

3. The device of claim 1, wherein the first and second compliant legs are collinear.

4. The device of claim 1, wherein the third compliant leg is substantially perpendicular to both the first and second compliant legs.

5. The device of claim 1, wherein the third compliant leg is angled at an obtuse angle with respect to the first compliant leg and at an acute angle with respect to the second compliant leg.

6. The device of claim 5, wherein the plurality of compliant legs further comprises:
   a fourth compliant leg extending outward from the compliant central body,
   wherein the third and fourth legs are collinear.

7. The device of claim 1, wherein the plurality of compliant legs further comprises:

a fourth compliant leg extending outward from the compliant central body, wherein the third and fourth legs are collinear.

8. The device of claim 1, wherein the plurality of compliant legs further comprises:

a fourth compliant leg extending outward from the compliant central body, wherein the fourth compliant leg is substantially perpendicular to each of the first, second, and third compliant legs.

9. The device of claim 1, wherein each of the plurality of compliant legs is discretely coplanar with each of the other of the plurality of legs.

10. A device for sealing intersecting joints, the device comprising:

a first compliant portion;

a second compliant portion intersecting with the first compliant portion at an angle; and a third compliant portion intersecting with both the first compliant portion and the second compliant portion, wherein the third compliant portion is collinear with the first compliant portion or the second compliant portion and each of the first, second, and third compliant portions include a through bore comprising an elongate member having a bore opening at a distal end and an open channel extending from the bore opening along a length of the elongate member.

11. The device of claim 10, wherein the angle is obtuse.

12. The device of claim 10, wherein the first compliant portion has a first through bore diameter and the second compliant portion has a second through bore diameter less than the first through bore diameter.

13. The device of claim 10, wherein the third compliant portion is collinear with the first compliant portion and substantially perpendicular to the second compliant portion.

14. A device for sealing intersecting joints, the device comprising:

a compliant central body;

a first compliant leg extending outward from the compliant central body; and a second compliant leg extending outward from the compliant central body coplanar with respect to the first compliant leg, wherein each of the first compliant leg and the second compliant leg includes a blind bore comprising a bore opening at a distal end and a bore extending from the bore opening to a termination at a proximal end adjacent the compliant central body.

15. The device of claim 14, wherein the first compliant leg has a first blind bore diameter and the second compliant leg has a second blind bore diameter less than the first blind bore diameter.

16. The device of claim 14, further comprising:

a third compliant leg extending outward from the compliant central body at an angle relative to both the first compliant leg and the second compliant leg.

17. The device of claim 16, wherein the third compliant leg is angled at an obtuse angle with respect to the first compliant leg and at an acute angle with respect to the second compliant leg.

18. The device of claim 17, further comprising:

a fourth compliant leg extending outward from the compliant central body, wherein the third and fourth legs are collinear.

19. The device of claim 16, further comprising:

a fourth compliant leg extending outward from the compliant central body, wherein the fourth compliant leg is substantially perpendicular to each of the first, second, and third compliant legs.

20. The device of claim 14, wherein the first and second compliant legs are collinear.

* * * * *